United States Patent [19]

Kuraishi

[11] 4,095,245
[45] June 13, 1978

[54] ADAPTER FOR ELECTRONIC FLASH APPARATUS

[75] Inventor: Kaoru Kuraishi, Tokyo, Japan

[73] Assignee: Toshiba Photo Products Co., Ltd., Tokyo, Japan

[21] Appl. No.: 712,539

[22] Filed: Aug. 9, 1976

[30] Foreign Application Priority Data

Aug. 15, 1975  Japan ........................... 50-999376

[51] Int. Cl.² ............................................. G03B 15/02
[52] U.S. Cl. ................................ 354/141; 354/145; 354/295; 315/241 P; 362/7
[58] Field of Search ............... 362/7, 15; 354/27, 32, 354/33, 34, 35, 60 F, 129, 132, 137, 139, 140, 141, 145, 149, 288, 293, 295; 240/1.3; 315/241 P, 241 R

[56] References Cited

U.S. PATENT DOCUMENTS

| | | | |
|---|---|---|---|
| 2,576,934 | 12/1951 | Grier | 354/145 X |
| 3,614,918 | 10/1971 | Hennig et al. | 354/33 X |
| 3,727,100 | 4/1973 | Kuraishi et al. | 354/33 X |
| 3,731,605 | 5/1973 | Kitagawa | 354/141 |
| 3,852,790 | 12/1974 | Robinson | 354/145 |
| 3,858,227 | 12/1974 | Ellin et al. | 354/145 |
| 3,894,226 | 7/1975 | Hanson | 240/1.3 |
| 3,969,737 | 7/1976 | Kendrick | 354/141 |

*Primary Examiner*—L. T. Hix
*Assistant Examiner*—William B. Perkey

[57] ABSTRACT

An adapter for electronic flash apparatus comprises a pair of first external connection terminals detachably connected to high tension pulse takeout terminals of a camera incorporating means for generating the high tension pulse in response to the action of the shutter of the camera; and a pair of second external connection terminals detachably connected to a pair of terminals of a trigger circuit included in an electronic flash apparatus or unit which further comprises a power supply and a flash discharge lamp supplied with the power supply voltage and in which the trigger circuit is supplied with the supply voltage between the trigger circuit terminals to start the flash discharge lamp when the pair of terminals of the trigger circuit is short circuited. The adapter further includes an electronic flash unit control circuit which comprises a cold cathode thyratron to be made conductive in synchronism with the high tension pulse generation and is adapted to make a substantial short circuit between the terminals of the trigger circuit in synchronism with the conduction or a predetermined time period after the conduction.

2 Claims, 10 Drawing Figures

ADAPTER FOR ELECTRONIC FLASH APPARATUS

This invention relates to an adapter for an electronic flash apparatus which is adapted to be used in a camera incorporating a means for generating a high tension pulse in response to the opening of a camera shutter.

In general, an electronic flash apparatus for a camera includes a flash discharge lamp adapted to flash through discharge of a main capacitor or an energy storage capacitor precharged by a power supply voltage, and a trigger circuit for causing to flash the flash discharge lamp in synchronisam with the opening of a camera shutter. The trigger circuit includes a pair of terminals between which the power supply voltage is applied, and an auxiliary capacitor precharged by the power supply voltage through the paired terminals. The flash apparatus is so constructed that when a short occurs between the paired terminals by being interlocked with the opening of the shutter the flash discharge lamp flashes. The camera (hereinafter referred to as an ordinary camera) for use in the flash apparatus has a built-in synchro contact switch adapted to be closed in interlock with the opening of the camera shutter. When, therefore, the electronic flash apparatus is mounted on the camera and the synchro contact switch is electrically connected to the paired terminals of a trigger circuit for the electronic flash unit, the flash discharge lamp can flash in response to the opening of the camera shutter.

Another type of camera has no such synchro contact switch and includes a means (constructed of a piezoelectric element) for generating a high tension pulse of 2 to 3 kV in synchronism with the opening of a camera shutter, the high tension pulse leading to the external connection terminals of the camera. Such a camera is hereinafter referred to as a special camera. The application of the special camera is restricted to a flash apparatus of the type in which a special flash bulb includes a primer and zirconium wire. In this type of flash apparatus the primer is ignited by application of a high tension pulse, permitting the flash bulb to emit a main flash through combustion of the zirconium wire. When, however, such a special flash bulb is used, a cost per flash is very high as compared with the electronic flash apparatus.

It is accordingly the object of this invention to provide an adapter designed for a special camera having a means for generating a high tension pulse in response to the opening of a camera shutter and adapted to be used together with an electronic flash apparatus designed for an ordinary camera having a synchro contact switch.

According to this invention there is provided an adapter for an electronic flash apparatus, comprising a pair of first external connection terminals detachably connected to a high tension pulse takeout terminals of a camera incorporating a means for generating the high tension pulse in interlock with the action of a camera shutter; a pair of second external connection terminals detachably connected to paired terminals of a trigger circuit included in the electronic flash apparatus which further includes a power supply, a flash discharge lamp and a capacitor connected to the power supply respectively, and in which the flash discharge lamp flashes through discharge of the capacitor when the pair of terminals of the trigger circuit is short circuited, the power supply voltage being applied between the pair of terminals of the trigger circuit; and an electronic flash apparatus control circuit which includes a cold cathode thyratron connected to the first and second external connection terminals and adapted to conduct in synchronism with the generation of the high tension pulse from the camera and which is adapted to make a substantial short circuit between the pair of terminals of the trigger circuit.

According to this invention, therefore, there is provided an adapter which is designed for a special camera including a high tension pulse generating means and having no synchro contact switch and which is adapted to be used together with an electronic flash apparatus designed for an ordinary camera having a synchro contact switch.

This invention will be further described by way of example by reference to the accompanying drawings in which.

Figure 1:
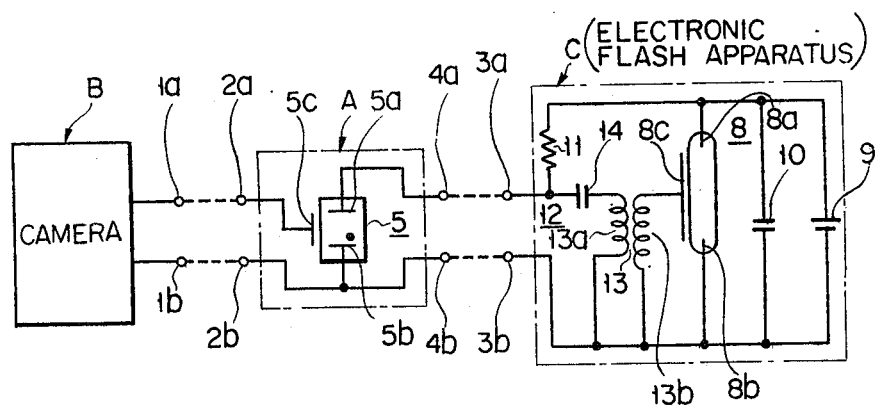
FIG. 1 is a view showing a connection between the connection of an adapter according to one embodiment of this invention, a camera and an electronic flash apparatus.
Figure 2:
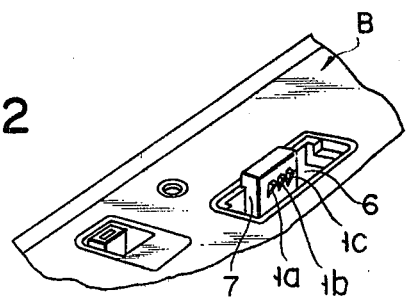
FIG. 2 is a perspective view showing a part of the upper portion of a camera, particularly high tension pulse takeout terminals to be coupled to the adapter shown in FIG. 1.

An adapter A, camera B and electronic flash apparatus or unit C are coupled as indicated in FIG. 1. The adapter A includes two first external connection terminals 2a and 2b detachably coupled to the terminals 1a and 1b from which a high tension pulse from a high tension pulse generating means (not shown) incorporated in the camera B is taken out and two second external connection terminals 4a and 4b detachably coupled to terminals 3a and 3b of a trigger circuit 12 in the electronic flash unit C. The adapter A further includes a cold cathode thyratron 5 having main electrodes 5a and 5b and control electrode 5c. The control electrode 5c and main electrode 5b are directly connected to the first external connection terminals 2a and 2b, respectively, and the main electrodes 5a and 5b are connected to the second external connection terminals 4a and 4b, respectively. The high tension pulse from the high tension pulse generating means is fed to the high tension pulse takeout terminals 1a and 1b mounted on an insulating member 7 which projects from a recess 6 in the top surface of the camera B as shown in FIG. 2. The terminal 1c has no particular relation to the apparatus of this invention. The electronic flash unit C includes a flash discharge tube 8 for example, a xenon gas discharge tube, having main electrodes 8a and 8b, and control electrode 8c, a power source 9 and a main capacitor 10 each connected between the main electrodes 8a and 8b, a trigger circuit 12 coupled through a resistor 11 and between the main electrodes 8a and 8b. The trigger circuit 12 includes a pulse transformer 13 having a primary winding 13a connected through the resistor 11 and auxiliary capacitor 14 and between the main electrodes 8a and 8b, and a secondary winding 13b connected between the control electrode 8c and the main electrode 8b. A conjunction between the resistor 11 and the auxiliary capacitor 14 and main electrode 8b are connected to the terminals 3a and 3b, respectively, of the trigger circuit 12. Since the auxiliary capacitor 14 is preliminarily charged through the power source 9, when a short occurs between the terminals 3a and 3b, the auxiliary capacitor 14 is discharged. As a result, a high voltage is applied between the control electrode 8c and the main electrode 8b and the flash discharge tube 8 is flashed through the discharge of the main capacitor 10.

In the circuit arrangement shown in FIG. 1 a high tension pulse from the high tension generating means responsive to the action of a shutter of the camera B appears on the high tension pulse takeout terminals 1a and 1b. Since the high tension pulse is applied, through the first external connection terminals 2a and 2b, between the control electrode 5c and the main electrode 5b of the cold cathode thyratron 5, the cold cathode thyratron is rendered conductive. The main electrodes 5a and 5b are connected respectively through the second connection terminals 4a and 4b to the trigger circuit 12, and in consequence a substantial short occurs between the terminals 3a and 3b. For the reason set out above, the flash discharge tube 8 flashes in response to the action of the shutter of the camera.

Figure 3A:
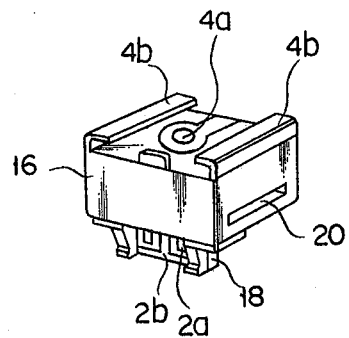
FIG. 3A is a perspective view showing the adapter in FIG. 1, FIG. 3B a perspective view showing a mounting metal fitting for detachably mounting the adapter in FIG. 3 on a camera, and FIG. 3C a perspective view showing the adapter coupled with the camera and the electronic flash unit.
Figure 3B:
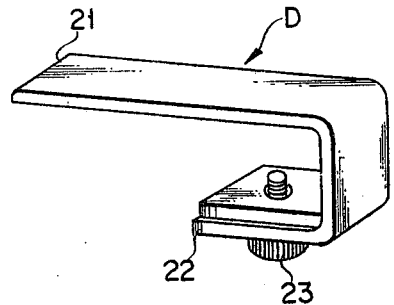
Figure 3C:
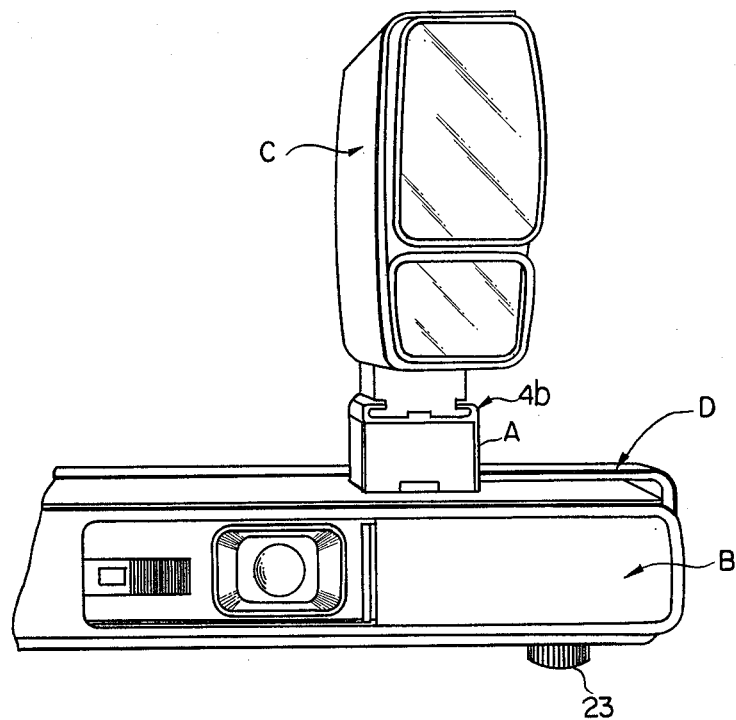

The outer shape of the adapter A is shown in FIG. 3A. In the adaptor A the first external connection terminals 2a and 2b are provided, in the form of contacts, below a casing 16 including the starting control circuit. The contacts 2a and 2b are held in place by a pair of projecting members 18. When the projecting members 18 of the casing 16 are inserted into the recess 6 of the camera shown in FIG. 2 the casing 16 is mounted on the camera B with the contacts 2a and 2b engaged with the contacts 1a and 1b. The shown second external connection terminals 4a and 4b (generally called direct contact shoe terminals) are provided on the upper surface of the casing 16. An opening 20 for inserting an end of a mounting metal fitting D to be set out below is provided in the side of the casing 16. The mounting metal fitting D is substantially U-shaped as shown in FIG. 3B to permit the camera B to be sandwiched and one end 21 of the mounting metal fitting D is inserted into the opening 20 of the adapter A. The other end 22 of the mounting metal fitting D has a screw 23 by which the metal fitting D is secured to the camera B. The electronic flash unit C is adapted to be mounted on the adapter A with the paired terminals 3a and 3b engaged with the second external connection terminals 4a and 4b of the adapter A. The camera B, mounting metal fitting D, adapter A and electronic flash unit C are connected as shown in FIG. 3C.

Figure 4A:
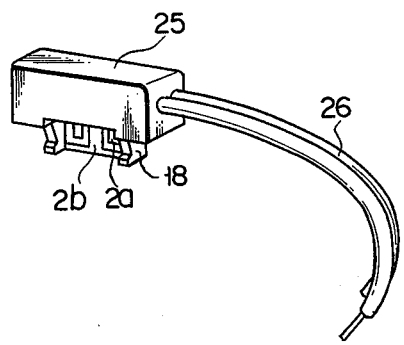
FIG. 4A is a perspective view showing a plug of a modified form of an adapter according to this invention.
Figure 4B:
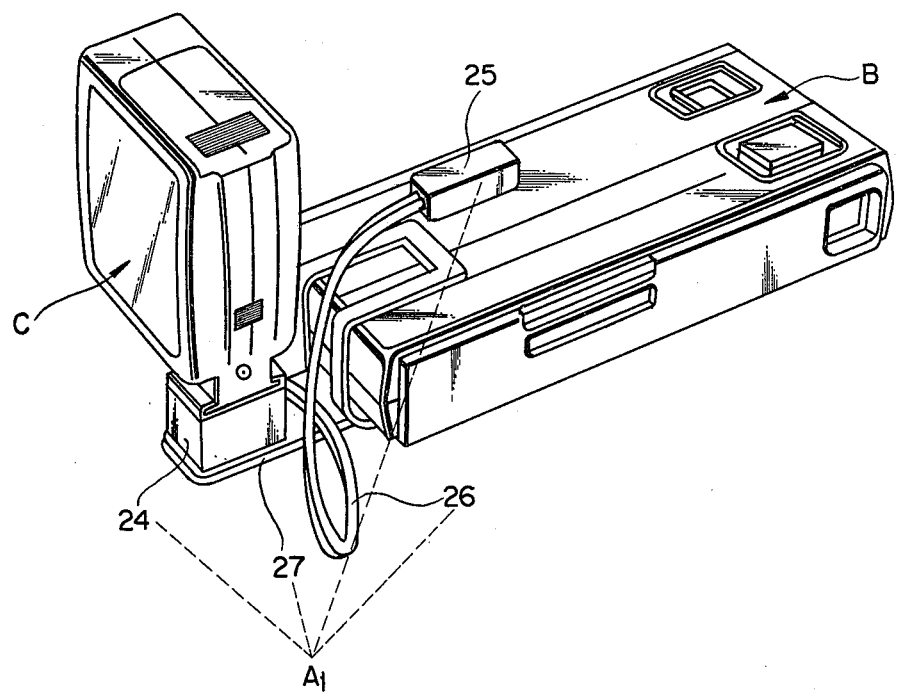
FIG. 4B is a perspective view showing the modified adapter coupled to the camera and electronic flash unit.

FIGS. 4A and 4B show a modified form of an adapter according to this invention. The modified adapter A1 includes an adapter body 24, metal fitting 27 mounted integral with the adapter body 24 and adapted to detachably secure the adapter body 24 to the camera B, plug 25 and flexible cord 26 electrically connecting the plug 25 to the adapter body 24. As shown in FIG. 4A, first external connection terminals 2a and 2b and projecting members 18 are similar to those shown in FIG. 3A. The external connection terminals 2a and 2b are detachably coupled to the high tension pulse takeout terminals 1a and 1b and a cord 26 is connected at one end to the terminals 2a and 2b. The adaptor body 24 includes the cold cathode thyratron 5 shown in FIG. 1 and its connection. Second external connection terminals 4a and 4b, not shown in FIG. 4B, are provided in the same manner as shown in FIG. 3A and removably connected to the terminals 3a and 3b of the trigger circuit 12. The cord 26 is connected at the other end to the main electrode 5b and control electrode 5c in the cold cathode thyratron 5 incorporated in the adapter body 24. The adapter A1, camera B and electronic flash unit C are connected as shown in FIG. 4B.

Figure 5A:
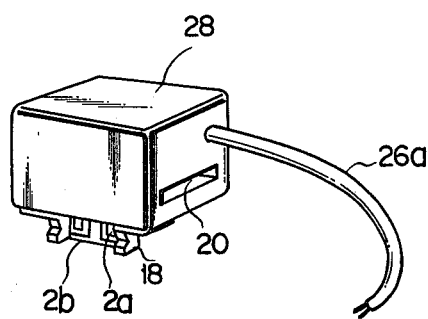
FIG. 5A is a perspective view showing a body section of another modified form of an adapter according to this invention and FIG. 5B is a perspective view showing the adapter in FIG. 5A which is coupled with the camera and electronic flash unit.
Figure 5B:
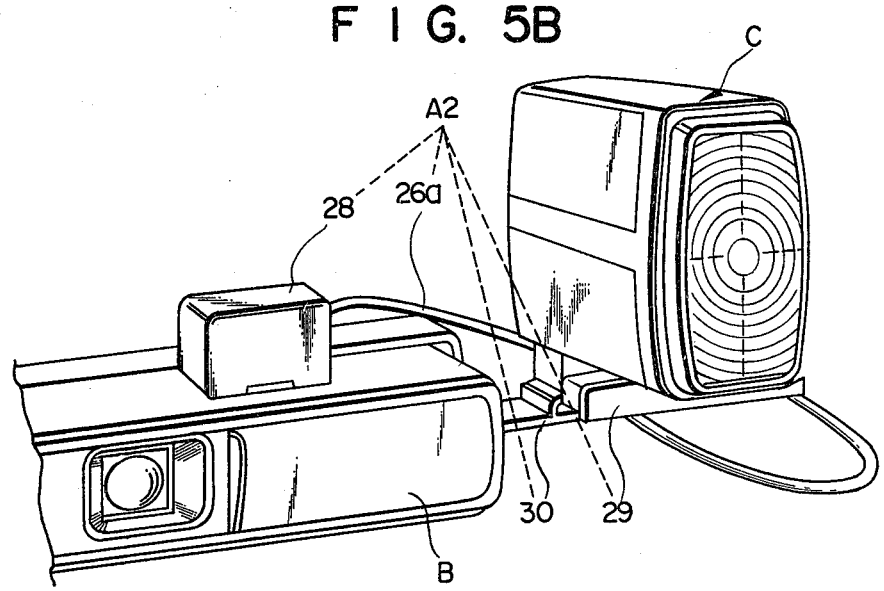

FIGS. 5A and 5B show another modified form of an adapter according to this invention. In this modification the adapter A2 comprises an adapter body 28, receptacle 29, mounting metal fitting 30 and cord 26a. As shown in FIG. 5A the adaptor body 28 has projected members 18, opening 20 for inserting one end of a mounting metal fitting 30, and first external connection terminals 2a and 2b as similar to those shown in FIG. 3A. The receptacle 29 has second external connection terminals 4a and 4b (not shown) which can be removably connected to the terminals 3a and 3b of the trigger circuit in the electronic flash unit C. The cord 26a is connected at one end to the second outer connection terminals 4a and 4b and at the other end to the main electrodes 5a and 5b of the cold cathode thyratron 5 which is received in the adaptor body 28. The adaptor A2, camera B and electronic flash unit C are connected as shown in FIG. 5B.

Figure 6:
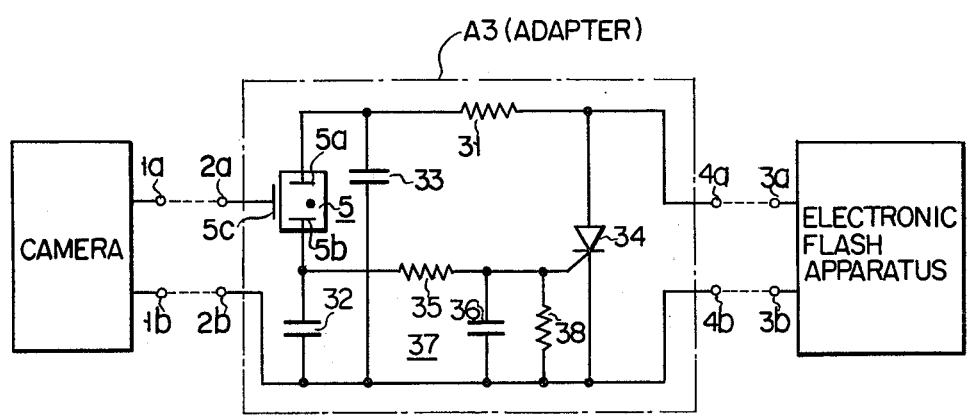
FIG. 6 is a view showing a connection between an adapter according to another embodiment of this invention, the camera and the electronic flash unit.

Another special camera is adapted to generate a high tension pulse a predetermined time before the shutter of the camera is opened. It is because that in another type of flash lamp a maximum flash appears several milliseconds after a high tension pulse is applied to the flash lamp, that is, the maximum flash of the flash lamp should be made synchronous with the time at which the shutter of the camera is opened. The embodiment of this invention as applicable to such a special camera is indicated by A3 in FIG. 6. In the circuit arrangement shown in FIG. 6 the cold cathode thyratron 5 is connected through a resistor 31 to the second external connection terminal 4a and through a capacitor 32 to the second external connection terminal 4b. A control electrode 5c of the thyratron 5 is directly connected to the first external connection terminals 2a, and a junction between the capacitor 32 and the second external connection terminal 4b is connected to the first external connection terminal 2b. A capacitor 33 is connected across a series circuit consisting of the cold cathode thyratron 5 and the capacitor 32. A silicon controlled rectifier (SCR) element 34 is connected between the second external connection terminals 4a and 4b with the polarities as shown. Across the capacitor 32 is connected a time constant circuit, i.e. a delay circuit 37, consisting of a resistor 35 and a capacitor 36. A control voltage is applied to the gate of the SCR 34 through an input resistance 38 which is connected across the capacitor 36. In this embodiment the capacitor 33 is precharged by a power source 9 (FIG. 1). When the cold cathode thyratron 5 conducts in synchronism with a high tension pulse from the camera B, the capacitor 33 is discharged through the thyratron 5 to charge the capacitor 32. Since a signal appearing across the capacitor 32 is delayed a predetermined time determined by the delay circuit 37, and then fed to the control electrode of the silicon controlled rectifier element 34, the second external terminals 4a and 4b are short circuited, by the silicon controlled rectifier element 34, a predetermined time after the thyratron 5 is rendered conductive. It is therefore possible to make the maximum flash time of the flash discharge lamp synchronous with the time in which the shutter of the camera is opened.

Although in the above-mentioned embodiments and modifications the cold cathode thyratron is used as a switching element, this invention is not restricted thereto. For example, use may be made of a semiconductor element, such as a transistor, having a control electrode. In this case, a necessary voltage dividing resistance is connected between the first external connection terminals 2a and 2b and a divided voltage is applied to the control electrode of the switching transistor. The second external connection terminals 4a and 4b of the adapter may take the form of a direct contact shoe or a synchro contact socket each designed for an ordinary camera or take any other form similar to a synchro contact switch used for the ordinary camera.

What is claimed is:

1. In combination: an adapter and an electronic flash unit having a trigger circuit, said adapter comprising:
   a pair of first external connection terminals detachably connected to high tension pulse take out terminals of a camera incorporating a high tension pulse generating means for generating the high tension pulse in response to the action of a shutter of said camera;
   a pair of second external connection terminals detachably connected to a pair of external connection terminals of said trigger circuit,
   and circuit means including at least a cold cathode thyratron having a control electrode directly connected to one of said first external connection terminals and a pair of main electrodes, said cold cathode thyratron being connected across said second external connection terminals through a first capacitor;
   a second capacitor connected in parallel with the series circuit of said cathode thyratron and said first capacitor, the junction between said first and second capacitors being connected to the other first external connection terminal;
   a semiconductor switching element connected between said second external connection terminals; and
   a delay circuit connected across said first capacitor and adapted to apply to the gate electrode of said semiconductor switching element a control signal for causing said semiconductor element to conduct a predetermined time after said cold cathode thyratron is rendered conductive,
   said circuit means being so arranged as to render said cold cathode thyratron conductive when said first external connection terminals receive said high tension pulse through said high tension pulse take out terminals of said camera and to short circuit said second external connection terminals in response to said conduction of said cold cathode thyratron;
   said electronic flash unit comprising a discharge lamp connected across a power supply and an energy storage capacitor charged by said power supply, and adapted to flash through discharge of said energy storage capacitor; and said trigger circuit being connected to receive said power supply voltage so as to permit said flash discharge lamp to be started when said pair of external connection terminals of said trigger circuit are short circuited.

2. The combination according to claim 1, in which said second external connection terminals are similar in construction to direct contact shoe terminals provided on an ordinary camera having a synchro contact switch, the direct contact shoe terminals being detachably connected to said pair of said external connection terminals of said trigger circuit.

* * * * *

UNITED STATES PATENT AND TRADEMARK OFFICE
CERTIFICATE OF CORRECTION

PATENT NO. : 4,095,245
DATED : June 13, 1978
INVENTOR(S) : Kaoru Kuraishi

It is certified that error appears in the above-identified patent and that said Letters Patent are hereby corrected as shown below:

[30] Foreign Application Priority Data

August 15, 1975 Japan . . . . . . . .50-99376

Signed and Sealed this

Second Day of January 1979

[SEAL]

Attest:

RUTH C. MASON
*Attesting Officer*

DONALD W. BANNER
*Commissioner of Patents and Trademarks*